3,830,719
CATHODIC PROTECTION SYSTEM FOR MARINE
PROPULSION UNIT
David T. Cavil, Menomonee Falls, Wis., assignor to
Outboard Marine Corporation, Waukegan, Ill.
Continuation of abandoned application Ser. No. 27,833
Apr. 13, 1970. This application Dec. 3, 1971, Ser. No.
204,585
Int. Cl. C23f 13/00
U.S. Cl. 204—196         18 Claims

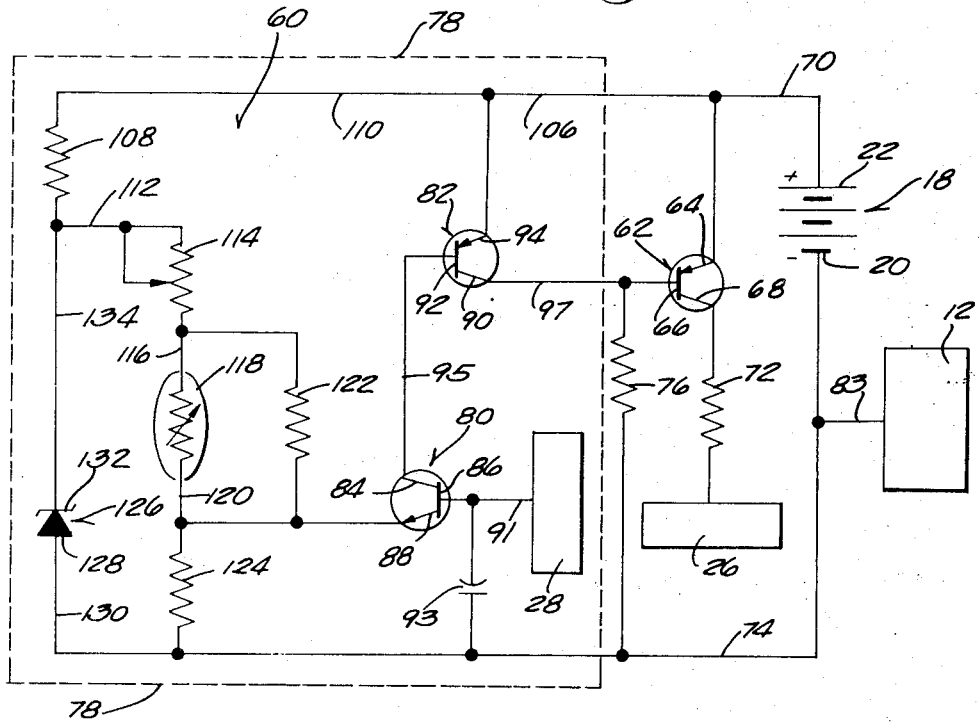

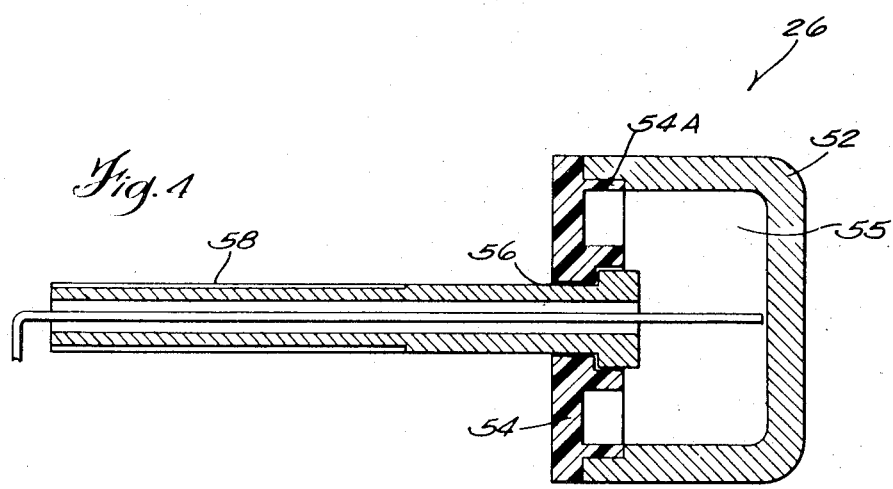
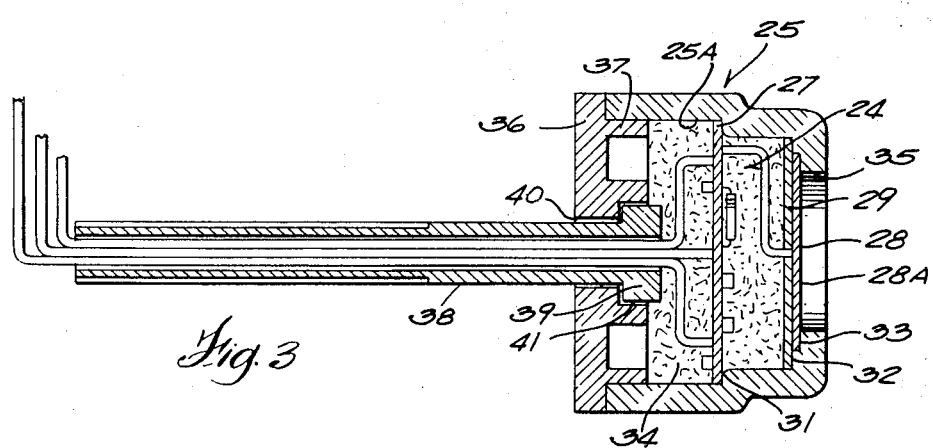

ABSTRACT OF THE DISCLOSURE

Disclosed herein is a cathodic protection system for the immersed surfaces of a marine propulsion device which includes a power supply, an anode supported on the boat hull below the water surface, and a transistor connected between the power supply and anode. Current flow through the transistor is regulated by a monitoring circuit stage which includes a reference electrode supported on the boat hull below the water surface. The circuit components are contained in a circuit module which is located in a housing below the water surface and which also supports one of the electrodes in a position exposed to the sea water.

RELATED APPLICATION

This application is a continuation-in-part application including the subject matter of my earlier filed application entitled "Cathodic Protection System for Marine Propulsion Unit," Ser. No. 27,833, filed April 13, 1970 now abandoned.

BACKGROUND OF INVENTION

The invention relates to cathodic protection systems for preventing corrosion of the metal surfaces of a marine propulsion device, which surfaces are immersed in sea water. More specifically, the cathodic protection system is of the type in which an anode connected to a power supply provides a current to the metal surface to be protected to cause the formation of a hydrogen layer or a polarization layer on the metal surface to isolate the metal surface from the sea water and minimize corrosion.

SUMMARY OF INVENTION

The invention provides a cathodic protection system for the immersed metallic surfaces of a marine propulsion device. An anode supported on the boat hull and located beneath the surface of the water supplies a current to the immersed metallic surface which is connected in a circuit to form a cathode. Current flow from a power source to the anode is controlled by a semi-conductor current controlling device such as a transistor. The state of conduction of the transistor and thus the current flow to the anode is controlled by a monitoring circuit stage which includes a reference electrode such as a silver, silver chloride half cell also immersed in the sea water. The monitoring circuit stage includes a semi-conductor shunt and an adjustable control to provide a predetermined polarization between the anode and the metal structure to be protected. When the desired polarization level between the anode and cathode is obtained, the shunt will deprive the transistor of base current and reduce the current flow through the transistor to the anode and to the metallic structure.

To minimize the effects of temperature variations on the calibration setting, the monitoring circuit stage includes a thermistor.

The invention also provides a circuit module contained in a housing which is immersed in the sea water and which supports one of the electrodes. The location of the circuit components in the sea water affords stability against temperature changes. The common support of one of the electrodes and the circuit module in the same housing reduces the possibility of disconnection of the supported electrode from the circuit, which disconnection could cause caustic formation on the metal structure to the protected. In the preferred construction, the reference electrode is carried by the housing which also supports the circuit module.

The invention also provides a marine cathodic protection device comprising an anode electrode, a reference electrode, first electrode supporting means adapted for supporting the anode electrode from a boat hull in position for immersion in water when the boat hull is at rest, second electrode supporting means adapted for supporting the reference electrode from the boat hull in position for immersion in water when the boat hull is at rest. Further in accordance with the invention, one of the electrode supporting means includes a housing having a hollow interior, together with a protective circuit including a plurality of components located in the hollow interior of the housing, and electrical connections extending from the housing, connected to the circuit, and adapted to connect the circuit to one terminal of a direct current source, to connect the circuit to a metallalic member to be protected on the boat hull in position for immersion in water when the boat hull is at rest, and to connect the circuit to the one of the electrodes supported by the other of the electrode supporting means. Also in accordance with the invention, the housing is adapted to be located exteriorly of the boat hull in position for immersion in water when the boat hull is at rest and the electrode supported by the one electrode supporting means is contained in the housing.

It is an object of the invention to provide a cathodic protection system for a marine propulsion device in which current flow from a power source to an anode is controlled by a transistor connected between the power source and anode and in which a monitoring circuit stage regulates the base current of the transistor in response to changes in potential between a reference electrode and the immersed surfaces of the marine propulsion device.

It is a further object of the invention to provide a cathodic protection system in which a circuit module containing circuit components is enclosed in an insulative housing which also supports one of the electrodes and is mounted on the boat hull beneath the surface of the water.

Further objects and advantages of the present invention will become apparent from the following disclosure.

THE DRAWINGS

FIG. 1 is a fragmentary side elevational view of the marine propulsion device and boat hull embodying the cathodic protection system of the invention.

FIG. 2 is a schematic diagram of the circuit in accordance with the invention.

FIG. 3 is an enlarged sectional view of the electrode assembly shown in FIG. 1.

FIG. 4 is an enlarged sectional view of the anode assembly shown in FIG. 1.

DETAILED DESCRIPTION

Referring to the drawings, FIG. 1 shows a marine propulsion device 10 having a drive shaft housing 11 and a lower unit gearcase 12 immersed in an electrolyte or sea water 14. The marine propulsion device 10 is supported on a boat hull 16.

In accordance with the invention, the cathodic protection system of the invention includes a power source 18 which can be in the form of a direct current battery with a negative terminal 20 and positive terminal 22, an anode electrode 52, a reference electrode 28, a first electrode supporting means supporting the anode electrode 52 from the boat hull 16 in position for immersion in water when the boat hull is at rest, and a second electrode supporting means supporting the reference electrode 28 from the boat hull 16 in position for immersion in water when the boat hull is at rest. Also in accordance with the invention, the cathodic protection system is further constructed so that one of the electrode supporting means includes a housing 25 having a hollow interior, together with a protective circuit including a plurality of components in the hollow housing interior 25A, and electrical connections extending from said housing and connected to the protective circuit, and to one terminal of a direct current source, to the metallic marine propulsion device to be protected and the electrode supported by the other of the electrode supporting means. In the preferred arrangement, the housing 25 is located exteriorly of the boat hull 16 in position for immersion in water when the boat hull 16 is at rest and the electrode supported by the one electrode supporting means is contained in the housing 25.

The plurality of components in the hollow interior 25A of the housing 25 constitute a circuit module 24 including an annular circuit board 27 (FIG. 3) which supports such circuit components, together with the connecting leads shown in FIG. 2.

The reference electrode or half cell 28 is desirably in the form of a silver, silver chloride cell which can be formed by photographically imposing a silver layer on a silver chloride plate or strip 28A. The reference electrode 28 is supported on an insulative or polyvinyl chloride disc 29. The circuit module or circuit components 24 can be associated with either the anode electrode 52 or the reference electrode 28. It is preferred that the reference electrode 28 be supported by the housing which also contains the circuit module 24.

The circuit module 24 is received in the interior 25A of the housing 25 which is desirably constructed of a corrosion resistance non-conducting or insulative material such as polyvinyl chloride. The housing 25 has first, second and third internal annular shoulders respectively 31, 32, and 33. When the circuit module 24 is assembled in the housing, the circuit board 27 seats against shoulder 31, the disc 29 seats against the shoulder 32 and the silver chloride plate 28A seats against the shoulder 33 with the electrode (in the preferred embodiment, the reference electrode 28) in registry with a window or aperture 35 in the housing 25 for exposure to the sea water.

Means are provided for anchoring the circuit module 24 in the housing in the form of an insulative cement or filler 34 such as epoxy potting compound. The housing 25 also includes a cover 36 which has an annular shoulder 37 which interfits in the interior 25A of the housing 25.

The electrode supporting means which includes the housing 25 comprises a threaded hollow shank or stud 38 with a head 39. The stud extends through an aperture 40 and the head 39 seats in a counterbore 41 in the cover 36. The connecting leads extend through a hollow interior bore in the stud 38 for connection inboard of the boat transom. The housing 25 is secured to the boat by suitable means below the water line and in the vicinity of the drive shaft housing.

The location of the circuit components in the immersed housing 25 keeps the components cool and prevents thermal cycling or thermal runaway of the transistors, which are connected in the circuit as hereinafter described. Furthermore, location of the circuit components and reference electrode in the housing 25 prevents disconnection of the reference electrode from the circuit. Such disconnection can cause overprotection and corrosion of the marine propulsion device.

The other electrode supporting means supports, as shown in FIG. 4, an anode assembly 26 which includes a housing which is formed from an alloy of lead, antimony and silver in a metallic cup shape and which constitutes the anode 52. The other electrode supporting means also includes an insulating cover 54 having a flange 54A which frictionally interfits in the interior 55 of the anode housing. An aperture 56 in the cover 54 receives a hollow threaded mounting shank or stud 58 adapted to connect the anode housing to the boat hull below the water line as shown in FIG. 1. A connecting lead extends through the interior of the shank 58 and is connected to the anode 52.

In accordance with the invention, the cathodic protection system includes a circuit 60 comprising various components including the plurality of components forming the before mentioned circuit module 24. More specifically, in order to control current flow from the power source 18 to the anode 52, the circuit 60 includes a first transistor 62 having an emitter 64, a base 66 and a collector 68. The emitter 64 is connected by a lead 70 to the positive terminal 22 of the power source or battery 18. The collector 68 is connected to the anode 26 by a first resistor 72. The resistor 72 prevents damage to transistor 62 if the anode 52 becomes shorted to ground or the negative terminal 20.

Base current is supplied to the base 66 by a lead 74 which is connected to the negative terminal 20 of the power source 18 and a resistor 76 which is connected to lead 74 and to the base 66.

In accordance with the invention, the current flow through transistor 62 and thus the polarizing current supplied to the marine propulsion device 10 is controlled by a monitoring circuit stage 78. The monitoring circuit stage 78 includes the silver, silver chloride half cell 28 and semi-conductor switch means in the form of a second transistor 80 and a third transistor 82. Transistor 80 has a collector 84, base 86 and emitter 88. The transistor 82 has a collector 90, base 92 and an emitter 94. The transistors 80 and 82 provide a shunt to deprive transistor 62 of base current and thus decrease the conduction of current to the anode to regulate the impressed current on the cathode. As disclosed, the marine propulsion device 10 forms the cathode and is connected to the negative terminal 20 of the battery 18 by a lead 83.

The extent of conduction of current through the transistors 80 and 82 and thus the extent to which the transistors 80 and 82 deprive the base 66 of transistor 62 of current is controlled by the silver, silver chloride half cell 28 which is connected by a lead 91 to the base 86 of transistor 80. To minimize changes in the potential of the silver, silver chloride half cell 28 due to transient effects, the circuit includes a capacitor 93 connected between the base 86 and lead 74.

The collector 84 of transistor 80 is connected by a lead 95 to the base 92 of transistor 82. The collector 90 of transistor 82 is connected by a lead 97 to the base 66 of transistor 62. The emitter 94 of transistor 82 is connected to the emitter 64 of transistor 62 and the positive terminal 22 of the batter 18 by a lead 106.

The monioring circuit also includes a resistor 108 which has one terminal connected by a lead 110 to the emitter 94 of the transistor 82 and the other terminal connected by a lead 112 to a variable resistor or potentiometer 114. The other terminal of the potentiometer 114 is connected by a lead 116 to one terminal of a thermistor 118. The other terminal of the thermistor 118 is connected by a lead 120 to the emitter 88 of transistor 80. A resistor 122 is connected in parallel with thermistor 118. The resistor 122 and the thermistor 118 minimize changes in the calibration level due to temperature variations.

The monitoring circuit also includes a resistor 108 which is connected to lead 120 and to lead 74. The circuit also includes a zener diode 126 which has an anode 128 connected by a lead 130 to lead 74 and a cathode 132 connected by a lead 134 to resistor 108.

To prevent corrosion of the aluminum marine propulsion device 10, it is desirably polarized to a potential of about 950 millivolts as sensed by the reference electrode 28. The desired polarization level of 950 millivolts is obtained by adjustment of variable resistor 114. The current through resistor 124 is adjusted by moving resistor 114 until the voltage drop from base to ground of transistor 80 at small base currents of transistor 80 is equal to 950 millivolts. Thus, transistor 80 will not have any base current until the potential of the reference electrode 28 with respect to ground rises to 950 millivolts. When the potential is below 950 millivolts, transistor 80 will be in a state of non-conduction and transistor 82 will also be non-conducting. The transistor 62 will receive base current through resistor 75, and current will be supplied from the power source through the transistor 62 to the anode 52.

As polarization of the surface of the marine propulsion device 10 increases and the potential of the reference cell 28 rises to 950 millivolts, the transistor 80 will receive base current from the reference electrode 28 and become conducting. When the transistor 80 becomes conducting, current flows through its collector 84 and supplies base current to transistor 82, causing it to conduct current through resistor 76 to thus shunt the transistor 62 and reduce the base current of transistor 62, and reduce the current flow from the power supply 18 to the anode 52 and to the marine propulsion device 10. When properly adjusted, the monitoring circuit will stabilize the anode current at a polarization level of the preset value, or 950 millivolts.

Various of the enumerated circuit components can be included in the module 24.

Various of the features of the invention are set forth in the following claims.

What is claimed is:

1. A cathodic protection system comprising an electrically non-conductive housing having a hollow interior and an aperture located for immersion in water, a circuit module located in said housing and including a reference electrode in communication with said housing aperture, and a protective circuit for protecting a metallic member to be protected, said circuit being electrically connected to said reference electrode and including a first lead extending from said housing and adapted to be connected to an anode electrode, a second lead extending from said housing and adapted to be connected to one terminal of a source of direct current, and a third lead extending from said housing and adapted to be connected to the metallic member to be protected.

2. A cathodic protection system in accordance with Claim 1 and further including a metallic member to be protected and electrically connected to said third lead, a source of direct current having a positive terminal connected to said second lead, and a negative terminal electrically connected to said metallic member, and an anode located for immersion in water and connected to said first lead, and wherein said circuit includes a first transistor having a base, an emitter connected to said second lead, and a collector connected to said first lead, and a monitoring circuit stage including said reference electrode, and semiconductor switch means connected to said second lead, to said third lead, and to said base of said transistor, said semi-conductor switch means being operative to change the state of conduction of said transistor when said reference electrode attains a predetermined potential with respect to said metallic member to be protected.

3. A cathodic protection system in accordance with Claim 2 wherein said semi-conductor switch means comprises a second transistor having a base, a collector connected to said base of said first transistor, an emitter connected to said second lead, a third transistor having a collector connected to said base of said second transistor, and a base electrically connected to said reference electrode.

4. A cathodic protection system in accordance with Claim 3 including a first resistor between said collector of said first transistor and said first lead, and a second resistor connected between said base of said first transistor and said third lead.

5. A cathodic protection system in accordance with Claim 4 including a third resistor having first and second terminals and a thermistor having a first terminal connected to said first terminal of said third resistor and a second terminal connected to said second terminal of said third resistor, and said second terminals being electrically connected to said emitter of said third transistor and said first terminals being connected to said emitter of said second ransistor.

6. A cathodic protection system in accordance with Claim 1 wherein said housing hollow interior includes first, second, and third shoulders, a board supporting said circuit and seated against said first shoulder, a reference electrode supporting member seated against said second shoulder and spaced from said board, and wherein said reference electrode is seated against said third shoulder.

7. A cathodic protection system in accordance with Claim 6 and further including a cover connected to said housing, a first insulator filler located between said board and said cover, a second insulator filler located between said board and said electrode supporting member, and means securing said housing to a supporting surface.

8. A cathodic protection system in accordance with Claim 7 wherein said means for securing said housing comprises a hollow post extending from said housing and wherein said leads extend through said hollow post.

9. A cathodic protection device comprising an electrically non-conductive housing having a hollow interior with first, second, and third shoulders and an aperture, a protective circuit for protecting a metallic member to be protected and including a reference electrode seated against said third shoulder in communication with said housing aperture, a circuit board seated against said first shoulder and at least partially supporting said circuit, and a reference electrode supporting member seated against said second shoulder and spaced from said circuit board.

10. A cathodic protection system in accordance with Claim 9 and further including a metallic member to be protected, an anode located for immersion in water, a source of direct current having a first terminal electrically connected to said metallic member and a second terminal, and wherein said circuit includes a first transistor having a base, an emitter connected to said second terminal, and a collector connected to said anode, and a monitoring circuit stage including said reference electrode, and semi-conductor switch means connected to said second terminal, to said metallic member and to said base of said transistor, said semi-conductor switch means being operative to change the state of conduction of said transistor when said reference electrode attains a predetermined potential with respect to said metallic member to be protected.

11. A cathodic protection device in accordance with Claim 9 and further including a cover connected to said housing, a first insulator filler located between said board and said cover, a second insulator filler located between said board and said electrode supporting member, and means securing said housing to a supporting surface.

12. A cathodic protection device in accordance with Claim 11 wherein said means for securing said housing comprises a hollow post extending from said housing.

13. A cathodic protection device in accordance with Claim 9 and further including a cover connected to said housing, said cover having an aperture, and a mounting shank extending from said housing and through said aperture, said shank including an enlarged head interiorly of said cover.

14. A marine cathodic protection system comprising a boat hull a source of direct current including a pair of terminals of opposite polarity, a metallic member to be protected on said boat hull in position for immersion in water when said boat hull is at rest and electrically connected to one of said terminals of said direct current source, an anode electrode, a reference electrode, first electrode supporting means supporting said anode electrode from said boat hull in position for immersion in water when said boat hull is at rest, second electrode supporting means supporting said reference electrode from said boat hull in position for immersion in water when said boat hull is at rest, one of said electrode supporting means including a housing having a hollow interior, and located exteriorly of said boat hull in position for immersion in water when said boat hull is at rest, a protective circuit including a plurality of components located in said hollow interior, a hollow mounting shank extending from said housing through said boat hull and communicating at one end with the interior of said housing and open at the other end, a first lead electrically connected to said circuit, extending through said mounting shank, and electrically connecting said circuit to said metallic member to be protected, by the other of said electrode supporting means, a second lead electrically connected to said circuit, extending through said mounting shank, and electrically connecting said circuit to said metallic member to be protected, and a third lead electrically connected to said circuit, extending through said mounting shank, and electrically connecting said circuit to the other of said terminals of said direct current source.

15. A marine cathodic protection system in accordance with Claim 14 wherein said electrode supported by said one electrode supporting means is contained in said housing.

16. A cathodic protection system in accordance with Claim 15 wherein said housing includes first, second, and third shoulders and an aperture, a circuit board seated against said first shoulder and supporting said plurality of circuit components, a reference electrode supporting member seated against said second shoulder and spaced from said circuit board, and wherein said reference electrode is seated against said third shoulder and in communication with said housing aperture.

17. A cathodic protection system in accordance with Claim 16 and further including a cover having a portion interfitting in said housing, a first insulating filler located between said circiut board and said cover, and a second insulating filler located between said circuit board and said electrode supporting member.

18. A cathodic protection system in accordance with Claim 16 and further including a cover connected to said housing, said cover having an aperture, and wherein said mounting shank extends through said aperture in said cover, said cover having an enlarged head interiorly of said cover.

References Cited
UNITED STATES PATENTS

| | | | |
|---|---|---|---|
| 3,169,105 | 2/1965 | Preiser et al. | 204—196 |
| 3,516,917 | 6/1970 | Maurin | 204—196 |
| 3,056,738 | 10/1962 | Fischer | 204—196 |
| 2,878,173 | 3/1959 | Obermann | 204—147 |
| 2,183,531 | 12/1939 | Allison | 202—195 |
| 2,926,128 | 2/1960 | Flower | 204—196 |
| 2,934,484 | 4/1960 | Anderson | 204—195 |
| 3,081,252 | 3/1963 | Preiser et al. | 204—196 |
| 3,272,731 | 9/1966 | Hutchison et al. | 204—195 |
| 3,458,421 | 7/1969 | Dahms | 204—195 |

TA-HSUNG TUNG, Primary Examiner